US007617106B2

(12) United States Patent
Schramm

(10) Patent No.: US 7,617,106 B2
(45) Date of Patent: Nov. 10, 2009

(54) ERROR DETECTION FOR SPEECH TO TEXT TRANSCRIPTION SYSTEMS

(75) Inventor: Hauke Schramm, Roetgen-Mulartshütte (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 266 days.

(21) Appl. No.: 10/578,073

(22) PCT Filed: Oct. 27, 2004

(86) PCT No.: PCT/IB2004/052218

§ 371 (c)(1),
(2), (4) Date: May 3, 2006

(87) PCT Pub. No.: WO2005/045803

PCT Pub. Date: May 19, 2005

(65) Prior Publication Data

US 2007/0027686 A1 Feb. 1, 2007

(30) Foreign Application Priority Data

Nov. 5, 2003 (EP) ................................ 03104078

(51) Int. Cl.
*G10L 19/00* (2006.01)
*G10L 15/00* (2006.01)
*G10L 13/00* (2006.01)

(52) U.S. Cl. ........................ 704/270; 704/231; 704/258

(58) Field of Classification Search ....................... None
See application file for complete search history.

(56) References Cited

U.S. PATENT DOCUMENTS

| | | | | |
|---|---|---|---|---|
| 5,799,273 | A * | 8/1998 | Mitchell et al. | 704/235 |
| 5,987,405 | A * | 11/1999 | Bantz et al. | 704/220 |
| 6,064,965 | A * | 5/2000 | Hanson | 704/275 |
| 6,088,674 | A * | 7/2000 | Yamazaki | 704/266 |
| 6,338,038 | B1 * | 1/2002 | Hanson | 704/500 |
| 6,490,563 | B2 * | 12/2002 | Hon et al. | 704/260 |
| 6,546,369 | B1 * | 4/2003 | Buth et al. | 704/275 |
| 7,010,489 | B1 * | 3/2006 | Lewis et al. | 704/260 |
| 2006/0149546 | A1 * | 7/2006 | Runge et al. | 704/246 |

* cited by examiner

*Primary Examiner*—David R Hudspeth
*Assistant Examiner*—Brian L Albertalli

(57) ABSTRACT

A method, a system and a computer program product detects errors within text generated by a speech to text transcription system. The transcribed text is re-transformed into an artificial speech signal by a text to speech transcription system. The original, natural speech signal and the artificially generated speech are provided to a proof reader for comparison of the two acoustic signals. Deviations between the original speech signal and the speech transformed from the transcribed text indicate, that an error may have occurred in the speech to text transcription process, which can be corrected manually. The speech signals to be compared can be provided acoustically and/or visually to the proof reader preferably by making use of a comparison signal deduced from the two speech signals. Major, correctly transcribed, parts of the text can be skipped during the proof reading process, saving time and enhancing effectivity of the entire proof reading process.

18 Claims, 4 Drawing Sheets

ERROR DETECTION FOR SPEECH TO TEXT TRANSCRIPTION SYSTEMS

The invention relates to the field of speech to text transcription systems and methods and more particularly to the detection of errors in speech to text transcriptions systems.

Speech transcription and speech recognition systems recognize speech, e.g. a spoken dictation and transcribe the recognized speech to text. Speech transcription systems are nowadays widely used, for example in the medical sector or in legal practices. There exists a variety of speech transcription systems, such as Speech Magic™ of Philips Electronics NV and the Via Voice™ system of IBM Corporation that are commercially available. Compared to a human transcriptionist, on the one hand a speech transcription system saves time and costs, but on the other hand it cannot provide such a high accuracy of speech understanding and command interpretation than a human transcriptionist.

A text which is generated by a speech to text transcription system inevitably comprises erroneous text portions. Such erroneous text portions arise due to many reasons, such as different environmental conditions like noise in which the speech has been recorded or different speakers to which the system is not properly adapted. Spoken commands within the dictation that relate to punctuation, text formatting or type face have to be properly interpreted by a speech to text transcription system instead of being literally transcribed as words.

Since speech to text transcription systems feature limited speech recognition capabilities as well as limited command interpretation capabilities, they inevitably produce errors in the transcribed text. In order to ensure that a dictation is properly transcribed into text, the generated text of a speech to text transcription system has to be checked for errors and erroneous text portions in a proof reading step. The proof reading typically has to be performed by a human proof reader. The proof reader compares the original speech signal of the dictation with the transcribed text generated by the speech to text transcription system.

Proof reading in the form of comparison is typically performed by listening to the original speech signal while simultaneously reading the transcribed text. Especially this kind of comparison is extremely exhausting for the proof reader since the text in form of visual information has to be compared with the speech signal which is provided in the form of acoustic information. The comparison therefore requires high concentration of the proof reader for a time corresponding to the duration of the dictation.

Taking into account that the error rates of a speech to text transcription system can be beneath 20% and may even decrease in the near future, it is clear that proof reading is not necessary for major parts of the transcribed text. Nevertheless the original source of the text is only available as a speech signal which is only accessible in a sequential way by listening to it. Comparing a written text with an acoustic signal can only be performed by listening to the acoustic signal in its entirety. Therefore the proof reading may even be more time consuming than the transcription process itself.

The present invention aims to provide a method, a system and a computer program product for an efficient error detection within text generated by an automatic speech to text transcription system.

The present invention provides a method for error detection for speech to text transcription systems. The speech to text transcription system receives a first speech signal and transcribes this first speech signal into text. In order to facilitate a proof reading or correction procedure which has to be performed by a human proof reader, the transcribed text is re-transformed into a second, synthetic speech signal. In this way the proof reader only has to compare two acoustic signals of first and second speech signal instead of comparing a first speech signal with the transcribed text. First and second speech signals are provided to the proof reader via a stereo headphone for example. In this way the proof reader listens simultaneously to the first and to the second speech signal and can easily detect potential deviations between the two speech signals indicating that an error has occurred in the speech to text transcription process.

The re-transformation of the transcribed text into a second speech signal is performed by a so called text to speech synthesizing system. Examples of text to speech synthesizing systems are disclosed in e.g. EP 0363233 and EP 0706170. Typical text to speech synthesizing systems are based on diphone synthesis techniques or unit selection synthesis techniques containing databases in which recorded parts of voices are stored.

According to a preferred embodiment of the invention, a way of generating a synthetic second speech signal from the transcribed text which is synchronous to the first speech signal is to invert the speech recognition process. Instead of producing output text from input feature vectors (representing e.g. a 10 ms portion of the first speech signal) the speech recognition system is also applied to generate output feature vectors from input text. This is can be achieved by first transforming the text into a (context-dependent) phoneme sequence and successively transforming the phoneme sequence into a Hidden-Markov-Model sequence (HMMs). The concatenated HMMs in turn generate the output feature vector sequence according to a distinct HMM state sequence. In order to support synchronization between first and second speech signal the HMM state sequence for generating the second speech signal is the optimal (Viterbi) state sequence obtained in the previous speech recognition step, in which the first speech signal has been transformed to text. This state sequence aligns each feature vector to a distinct Hidden-Markov-Model state and thus to a distinct part of the transcribed text.

According to a further preferred embodiment of the invention, the speed and/or the volume of the second speech signal which is extracted from the transcribed text of the first speech signal matches the speed and/or the volume of the first speech signal. The synthesizing of the second speech signal from the transcribed text is therefore performed with respect to the speed and/or the volume of the first, natural speech signal. This is advantageous, since a comparison between two acoustic signals that are synchronized is much easier than a comparison between two acoustic signals that are not synchronized. Therefore the synchronization of the transcribed text depends on the transcribed text corpus itself as well as on the speed and the dynamic range of the first, hence natural speech signal.

According to a further preferred embodiment of the invention, the first speech signal is also subject of a transformation. Preferably a set of filter functions is applied to the first speech signal in order to transform the spectrum of the first speech signal. In this way the spectrum of the first speech signal is assimilated to the spectrum of the synthesized second speech signal. As a consequence the sound of the natural first speech signal and the synthesized second speech signal approach, which facilitates once more the comparison of the two speech signals to be performed by the human proof reader. Finally two artificially generated or artificially sounding acoustic signals have to be compared instead of one artificial and one natural acoustic signal.

According to a further preferred embodiment of the invention an additional signal is generated by subtracting or superimposing the first and the second speech signal. When this kind of comparison signal is generated by subtracting the first and the second speech signal, the amplitude of this comparison signal indicates deviations between first and second speech signals. Especially large deviations between first and second speech signal are an indication that the speech to text transcription system has generated an error. Therefore, the comparison signal gives a direct indication whether an error has occurred in the speech to text transcription process. The comparison signal not necessarily has to be generated by a subtraction of the two speech signals. In general a huge variety of methods leading to a comparison signal from the first and second speech signal is conceivable, e.g. by means of a superposition or a convolution of speech signals.

According to a further preferred embodiment of the invention, a comparison signal is provided to the proof reader acoustically and/or visually. In this way the generated comparison signal is provided to the proof reader. By making use of this comparison signal, the proof reader can easier identify portions of the transcribed text that are erroneous. In particular when a comparison signal is provided visually in the transcribed text, the proof reader's attention is attracted to those text portions to which an appreciable comparison signal corresponds. Major parts of the correctly transcribed text associated with a comparison signal of low amplitude can be skipped in the proof-reading process. Consequently the efficiency of the proof reader and the proof reading process is remarkably enhanced.

According to a further preferred embodiment of the invention, the method for error detection produces an error indication when the amplitude of the comparison signal is beyond a predefined range. When for example the comparison signal is generated by a subtraction of the first and second speech signal, an error indication is outputted to the proof reader when the amplitude of the comparison signal exceeds a predefined threshold. The outputting of the error indication can occur acoustically as well as visually. By means of this error indication the proof reader no longer has to observe or listen to an awkwardly sounding comparison signal. The error indication may for example be realized by a distinct ringing tone.

According to a further preferred embodiment of the invention, the error indication is outputted visually within the transcribed text by means of a graphical user interface. In this way the proof reader no longer has to listen and to compare the two speech signals acoustically. Moreover the comparison between the first and the second speech signal is entirely represented by a comparison signal. Only in such cases when the comparison signal is beyond a predefined threshold value an error indication is outputted within the transcribed text. The proof reader's task then reduces to a manual control of those text portions that are assigned with an error indication. The proof reader may systematically select these text portions that are potentially erroneous. In order to check whether the speech to text transcription system produced an error the proof reader only listens to those clippings of the first and the second speech signals that correspond to the text portions that are assigned with an error indication.

The method therefore provides an efficient approach to filter only those text portions' of a transcribed text that might be erroneous. A listening to the complete first speech signal and a reading of the entire transcribed text for proofreading purpose is therefore no longer needed. The proof reading, that has to be performed by a human proof reader effectively reduces to those text portions that have been identified as potentially erroneous by the error detection system. In the same way as the time exposure of the proof reading process decreases, the overall efficiency of the proof reading is enhanced.

According to a further preferred embodiment of the invention, a pattern recognition is performed on the comparison signal in order to identify pre-defined patterns of the comparison signal being indicative of a distinct type of error in the text. Errors produced by the speech to text transcription system are typically due to misinterpretations of portions of the first, natural speech signal. Such errors especially occur for ambiguous portions of the natural speech signal, such as similarly sounding words with a different meaning and hence different spelling. For example the speech to text transcription system may produce nonsense words when for example a distinct spoken word is misrecognized as a similar sounding word. Such a confusion may occur several times during the transcription process. When now in turn the transcribed text is re-transformed into a second speech signal and when first and second speech signals are compared by means of the above described comparison signal, such a confusion between two words may lead to a distinct pattern in the comparison signal.

By means of a pattern recognition applied to the comparison signal a certain type of error produced by the transcription system may be directly identified. The distinct patterns corresponding to certain types of errors produced by the speech to text transcription system are typically stored by some kind of storing means and provided to the error detection method in order to identify different types of errors. Furthermore a pattern in the comparison signal that does not match any of the known pattern indicating some type of error may be assigned to an error and a correction procedure manually performed by the proof reader. In this way the method for error detection may collect various patterns in the comparison signal being assigned to a distinct type of error. Such a functionality could be interpreted as an autonomous learning.

According to a further preferred embodiment of the invention, a correction suggestion is provided with a detected type of error generated by the speech to text transcription system. Since a distinct type of error in the transcribed text is identified by means of a corresponding pattern of the comparison signal, the source of the error, the misrecognized portion of the speech signal can be resolved. A correction suggestion is preferably provided visually by means of a graphical user interface. The proof reading that has to be performed by the human proof reader ideally reduces to the steps of accepting or rejecting correction suggestions provided by the error detection system. When the proof reader accepts an error correction the error detection system automatically replaces the erroneous text portion of the transcribed text with the generated correction suggestion. Given the other case that the proof reader rejects a correction suggestion provided by the error detection system, the proof reader has to correct the erroneous text portion of the transcribed text manually.

The described method and system for error detection within text generated by a speech to text transcription system provides an efficient and less time consuming approach for proof reading of the transcribed text. The essential task of an indispensable human proof reader reduces to a minimum number of potentially misrecognized text portions within the transcribed text. In comparison to a conventional method of proof reading, the proof reader no, longer has to listen to the entire natural speech signal that has been transcribed by the speech to text transcription system.

In the following, preferred embodiments of the invention will be described in greater detail by making reference to the drawings in which.

Figure 1:
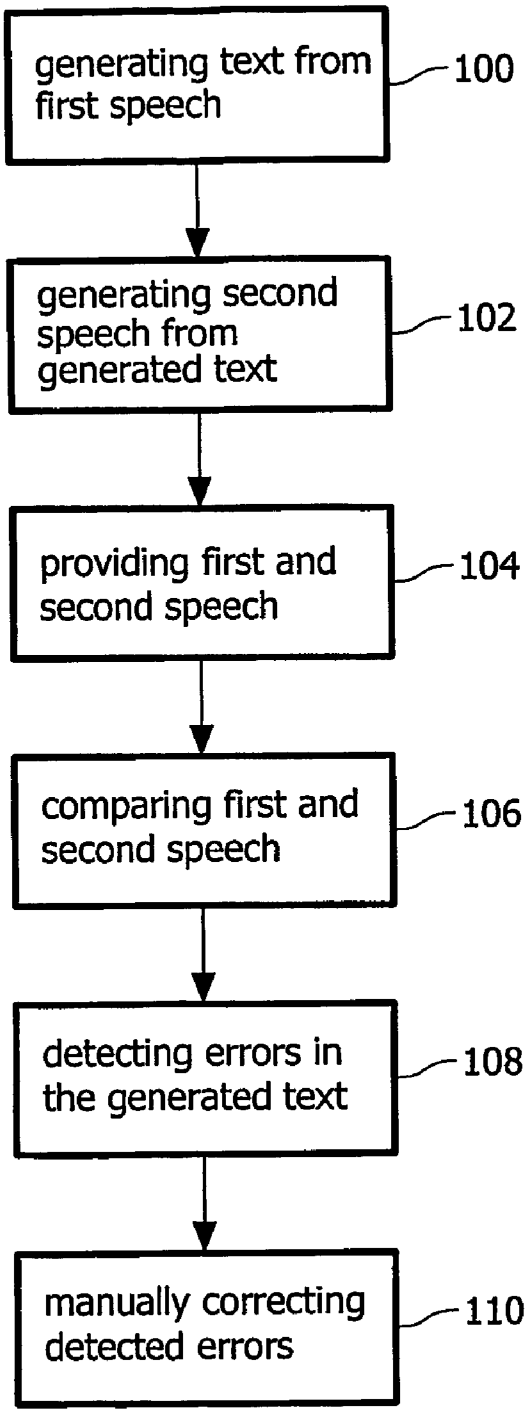
FIG. 1 is illustrative of a flow chart of the error detection method.

FIG. 1 shows a flow chart of the error detection method of the present invention. In a first step 100 text is generated from a first, natural speech signal by means of a conventional speech to text transcription system. In the next step 102 the transcribed text of step 100 is re-transformed into a second speech signal by means of a conventional text to speech synthesizing system. In the following step 104, the first natural speech signal and the second artificially generated speech signal are provided to a human proof reader. The proof reader listens to both first and second speech signal simultaneously in step 106. Typically first and second speech signals are synchronized in order to facilitate the acoustic comparison performed by the proofreader. In step 108 the proof reader detects deviations between the first and the second speech signal. Such deviations indicate that an error has occurred in step 100, in which the first, natural speech signal has been transcribed to text. When the proof reader has detected an error in step 108 the correction of the detected error within the text has to be performed manually.

In this way the proof reading, i.e. the comparison of the initial, natural speech signal and the transcribed text is no longer based on a comparison on an acoustic and a visual signal. Instead the proof reader has only to listen to two different acoustic signals. Only in case that an error has been detected, the proof reader has to find the corresponding text portion within the transcribed text and perform the correction.

Figure 2:
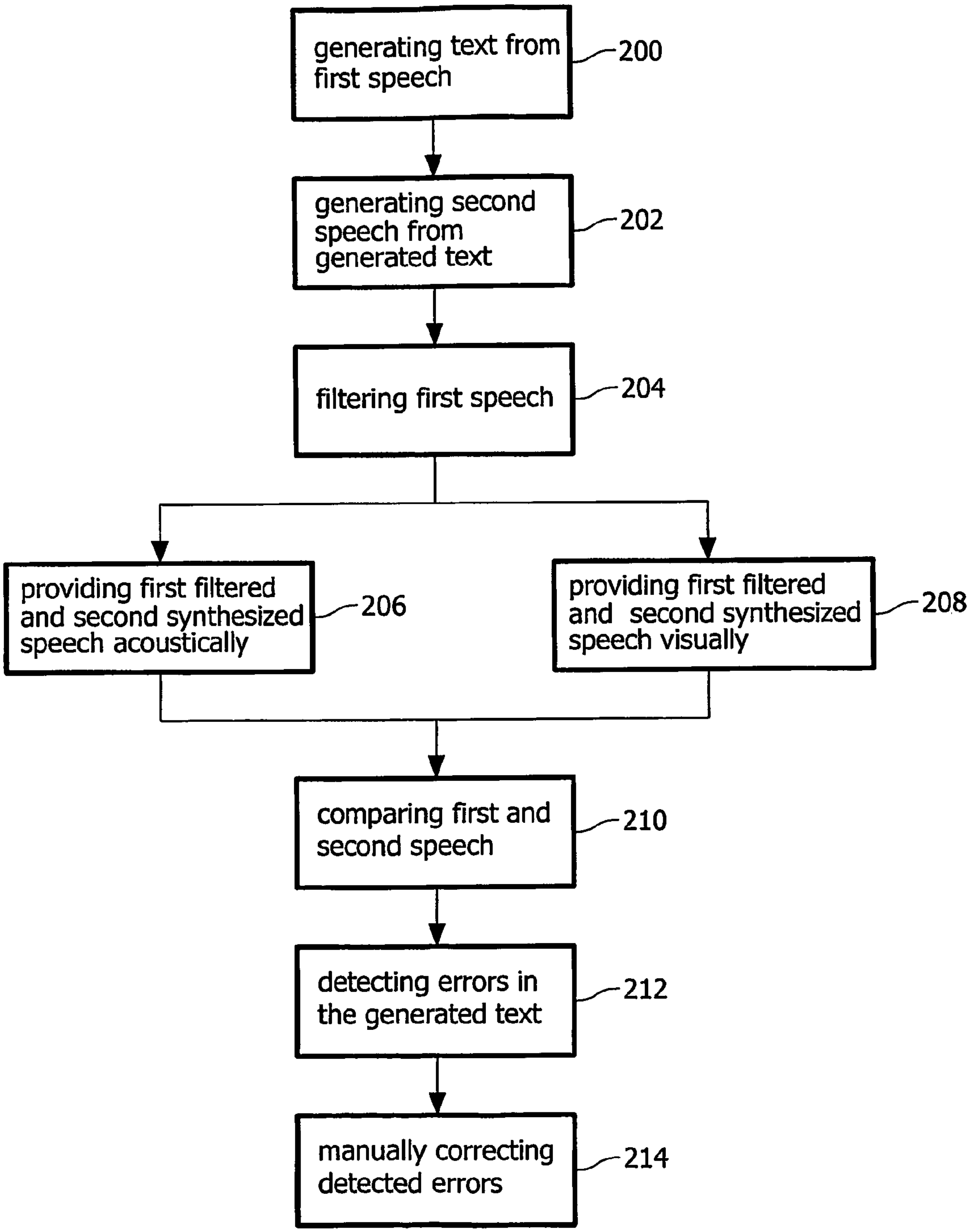
FIG. 2 is illustrative of a flow chart of the error detection method.

FIG. 2 is illustrative of a flow chart of an error detection method according to a preferred embodiment of the invention. Similar as illustrated in FIG. 1 in a first step 200 a text is transcribed from a first speech signal by a conventional text to speech transcription system. Based on the transcribed text, in the next step 202 an artificial speech signal is synthesized by means of a text to speech synthesizing system. In order to facilitate a comparison between the two speech signals a first, natural speech signal is applied to a set of filter functions in step 204 to approximate the spectrum of the natural speech signal to the spectrum of the second, artificially generated speech signal.

After that, the method either proceeds with step 206 or with step 208. In step 206 the filtered, first, natural speech signal as well as the second artificially generated speech signal are acoustically provided to the proof reader. In contrast in step 208 the filtered, natural first speech signal and the second artificially generated speech signal are visually provided to the proof reader. After the providing of first and second speech signals to the proof reader the method continues with step 210 in which the proof reader compares the first and the second speech signals either acoustically and/or visually. In a next step 212 the proof reader detects errors in the generated text either by means of listening to the two different speech signals and/or by means of a graphical representation of the two speech signals. In the final step 214 the detected errors are manually corrected by the proof reader.

Figure 3:
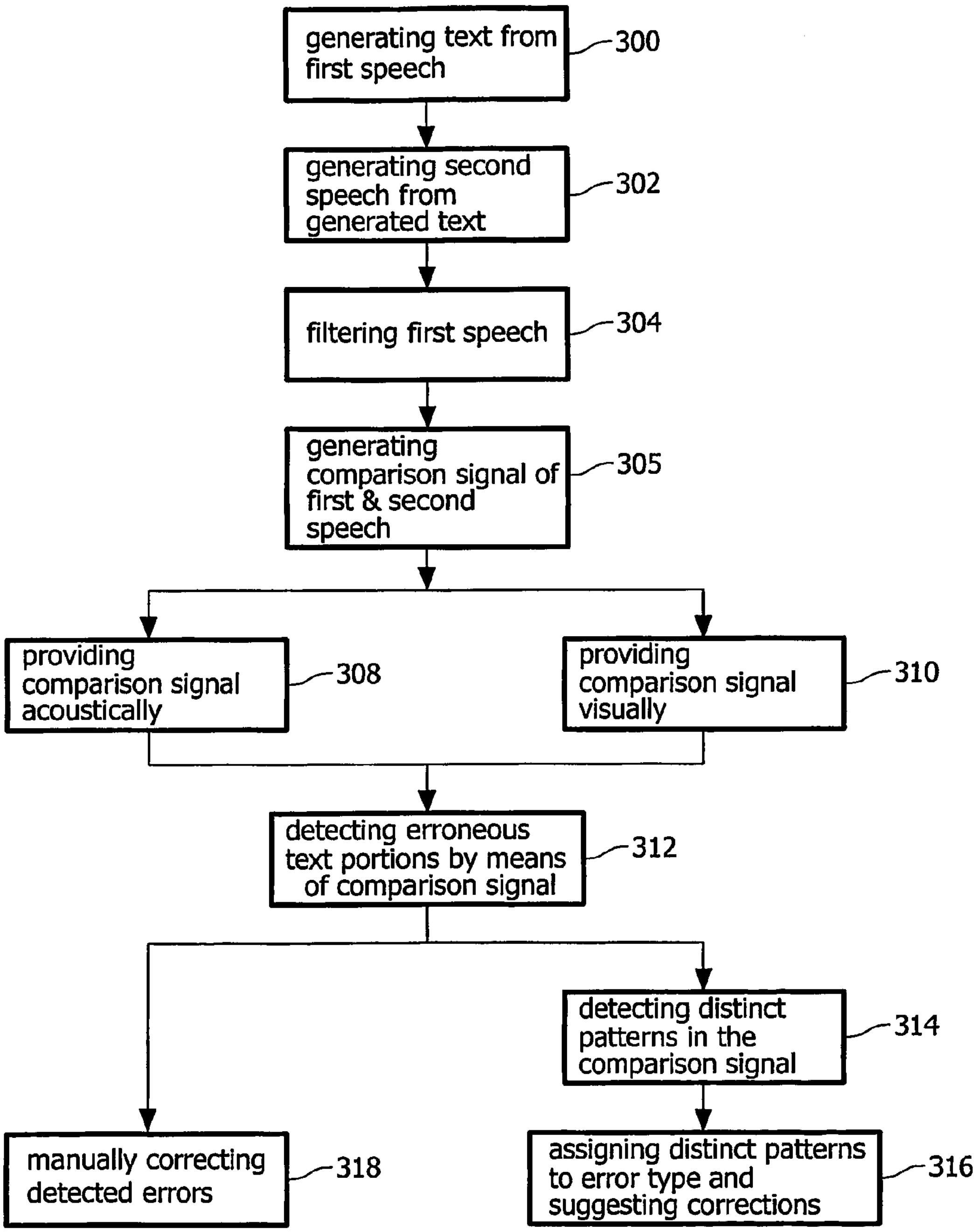
FIG. 3 is illustrative of a flow chart of the error detection method including pattern recognition of the comparison signal.

In FIG. 3 another flow chart illustrating an error detection method according to the present invention is shown. Again in a first step 300 a text is transcribed from a first, natural speech signal by means of a conventional speech to text transcription system. In a next step 302 the transcribed text is retransformed into a second speech signal by means of a text to speech synthesizing system. Similar as described in FIG. 2, in step 304 the first, natural speech signal is applied to a set of filter functions in order to assimilate the sound and the spectrum of the first speech signal to the sound and to the spectrum of the artificially generated second speech signal.

In the following step 306, a comparison signal between the first and second speech signal is generated by means of e.g. subtracting or superimposing the first and the second speech signal. Instead of providing the speech signals directly the method now restricts to provide the generated comparison signal. The comparison signal is either provided acoustically in step 308 or visually in step 310. Potential errors in the text can easily be detected in step 312 by means of the comparison signal.

When for example the comparison signal has been generated by subtracting the two speech signals, a potential error in the text can easily be detected when the amplitude of the comparison signal is above a predefined threshold. After the detection of potentially erroneous text portions in step 312, the correction of detected errors can either be performed manually in step 318 or one can make use of alternative steps 314 and 316. In step 314 a pattern recognition is applied to the comparison signal. When distinct portions of the comparison signal match two characteristic patterns that are stored in the system, the corresponding text portion of the transcribed text is identified as potentially erroneous. In the following step 316 those potentially erroneous text portions are assigned to a distinct type of error. The error information gathered in this way may be further exploited in order to generate suggestion corrections to eliminate these errors in the transcribed text.

Figure 4:
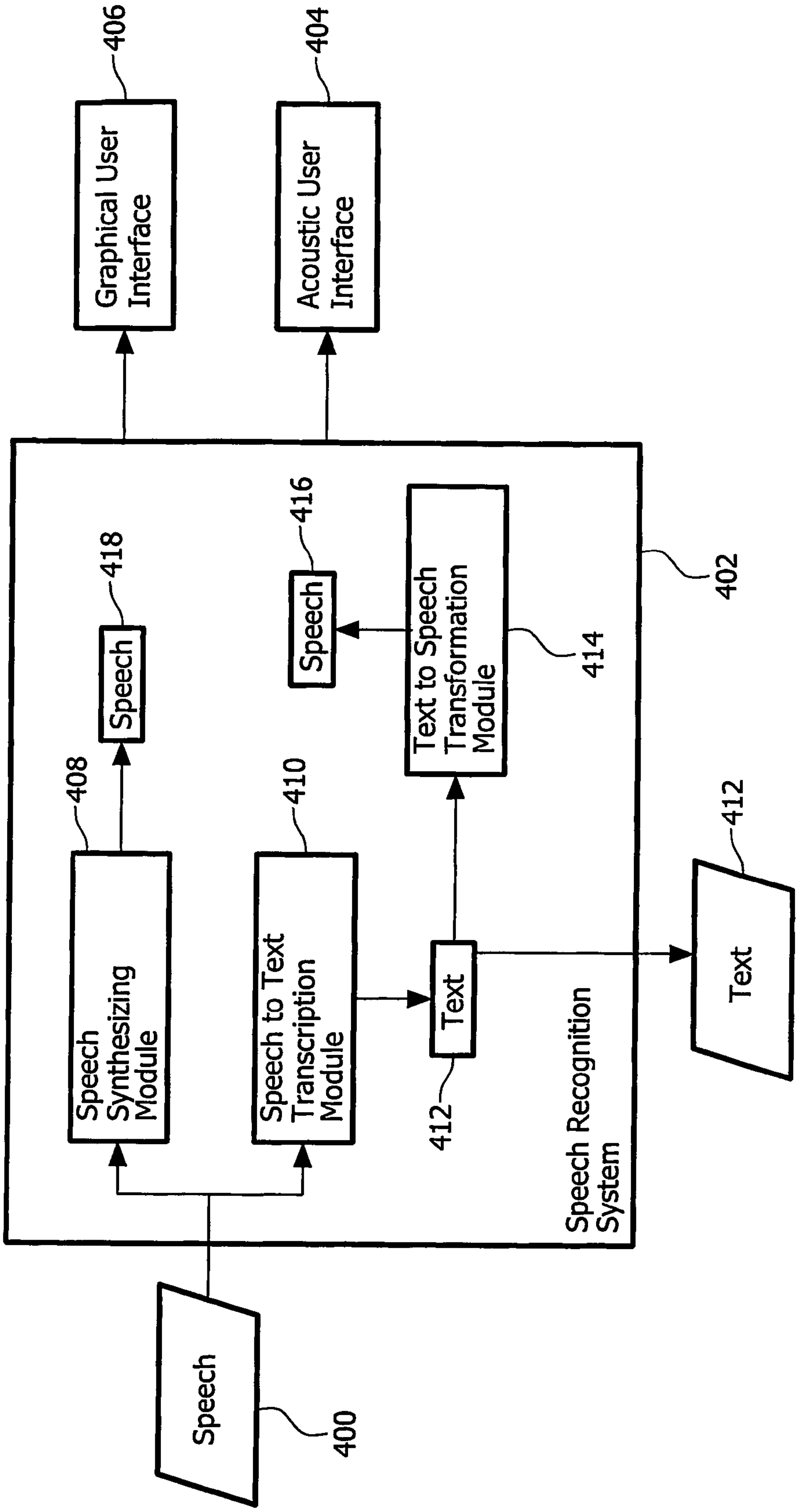
FIG. 4 shows a block diagram of a speech to text transcription system with error detecting means.

FIG. 4 shows a block diagram of an error detection system for a speech to text transcription system. A first speech signal 400 is inputted into an error detection module 402. The error detection module 402 comprises means for a speech to text transcription and generates a text 412 which is outputted from the error detection module 402. Furthermore the error detection module 402 is connected to a graphical user interface 406 and to an acoustic user interface 404. The error detection module 402 further comprises a speech synthesizing module 408, a speech to text transcription module 410, a text to speech transformation module 414 as well as a text 412, a first speech signal 418 and a second speech signal 416.

Natural speech signal 400 representing a dictation is inputted into the speech synthesizing module 408 and into the speech to text transcription module 410 of the error detection module 402. The speech to text transcription module 410 transcribes the speech signal 400 into a text 412. The generated text 412 is outputted as a transcribed text as well as being further processed within the error detection module 402. The text 412 is therefore provided to the text to speechs transformation module 414, which retransforms the transcribed text 412 to a second artificially generated speech signal 416.

The text to speech transformation module 414 is based on conventional techniques that are known from text to speech synthesizing systems. The artificially generated speech signal 416 can now be compared with the initial, natural speech signal 400 entering the error detection module 402 by means of the acoustic user interface 404. The acoustic user interface 404 can for example be implemented by a stereo headphone. The natural speech signal 400 may be provided on the left channel of the stereo headphone whereas the artificially generated speech signal 416 may be provided on the right channel of the headphone.

A human proof reader listening to both speech signals simultaneously can thus easily detect deviations between the two speech signals 400 and 416 that are due to misinterpretations or errors performed by the speech to text transcription module 410.

Since a comparison between a natural speech signal 400 and a machine generated speech signal 416 might be confusing or awkwardly sounding to the proof reader, the natural speech signal 400 can be filtered by the speech synthesizing module 408 applying a set of filter functions on the natural speech signal in order to assimilate the spectrum and the sound of the natural speech signal 400 to the synthesized speech signal 416. Therefore, the speech synthesizing module 408 transforms the natural speech signal 400 into a filtered speech signal 418. Similar as described above both speech signals, the filtered one 418 as well as the synthesized one 416 can acoustically be provided to the proof reader by means of the acoustic user interface 404.

Additionally or alternatively the two generated speech signals can be provided in a graphical representation by means of the graphical user interface 406. With the help of the graphical representation of the speech signals 416 and 418, the proof reader may skip major parts of the transcribed text that have been transcribed correctly. Especially when the error detection module 402 provides a further processing of the two speech signals 416 and 418 by means of generating a comparison signal being indicative of huge deviations of the two speech signals, the proof reading process and the detection and correction of errors produced by the speech to text transformation module 410 becomes more effective and less time consuming. A further processing of the generated comparison signal by means of pattern recognition wherein distinct patterns can be assigned to particular types of errors is of further advantage in order to facilitate the detection and correction tasks to be performed by the human proof reader.

The application has described preferred embodiment(s). Modifications and alterations may occur to others upon reading and understanding the preceding detailed description. It is intended that the invention be construed as including all such modifications and alterations insofar as they come within the scope of the appended claims or the equivalents thereof.

LIST OF REFERENCE NUMERALS

400 First Speech Signal
402 Error Detection Module
404 Acoustic User Interface
406 Graphical User Interface
408 Speech Synthesizing Module
410 Speech to Text Transcription Module
412 Text
414 Text to Speech Transformation Module
416 Second Speech Signal
418 Filtered Speech Signal

The invention claimed is:

1. A method for error detection within text transcribed from a first speech signal by an automatic speech-to-text transcription system, comprising:

synthesizing a second speech signal from the transcribed text;

providing first and second speech signal outputs for a comparison between first and second speech signals for an identification of potential errors in the text;

subtracting or superimposing first and second speech signals to generate a comparison signal; and at least one of:

providing the comparison signal acoustically and/or visually, and outputting an error indication when an amplitude of the comparison signal is beyond a predefined range.

2. The method according to claim 1, wherein speed and/or the volume of the second speech signal matches speed and/or the volume of the first speech signal.

3. The method according to claim 1, further including:

applying a set of filter functions to the first speech signal to approximate a spectrum of the first speech signal relative to a spectrum of the second speech signal.

4. The method of claim 1, further comprising:

assigning a pattern in the comparison signal that does not match any pre-trained patterns as a new pre-trained pattern indicative of a new type of error in the text.

5. A method for error detection within text transcribed from a first speech signal by an automatic speech-to-text transcription system, comprising:

synthesizing a second speech signal from the transcribed text;

comparing the first and second speech signals to identify potential errors in the transcribed text to generate a comparison signal; and identifying a pre-trained pattern in the comparison signal indicative of an error in the text using pattern recognition.

6. The method according to claim 5, further including:

applying an inverse speech transcription process to the second speech signal, generating a feature vector sequence from the text, using at least one of:

(a) statistical models of the speech-to-text transcription system and (b) a state sequence obtained in the process of transcription of the text from the first speech signal.

7. The method according to claim 5, wherein comparing the first and second speech signals includes subtracting or superimposing the first and second speech signals.

8. The method according to claim 5, further including:

outputting an error indication in response to an amplitude of the comparison signal being beyond a predefined range.

9. The method according to claim 8, further including:

outputting the error indication visually with transcribed text on a graphical user interface.

10. The method according to claim 5, further including:

providing a correction suggestion indicative of a detected type of error in the transcribed text.

11. An error detection system for a speech-to-text transcription system to provide a transcribed text from a first speech signal, the error detection system comprising:

a speech synthesis module which synthesizes a second speech signal from the transcribed text, an error detection module which compares the first and second speech signals for an identification of potential errors in the transcribed text, the error detection module performing at least one of:

acoustically or visually providing at least one of the first and second speech signals, a difference speech signal, and a superimposition of the first and second speech signals, and using pattern recognition to determine a type of error.

12. The detection system of claim 11, wherein the error detection module further assigns a distinct pattern that does not match any previous distinct pattern as a new distinct pattern indicative of a new detected type of error in the transcribed text.

13. An error detection system for a speech-to-text transcription system that transcribes text from a first speech signal, the error detection system comprising:

a speech synthesis module which synthesizes a second speech signal from the transcribed text;

an error detection module which compares the first and second speech signals to identify at least one potential error in the transcribed text and at least one of:

outputs an error indication when the comparison is beyond a predefined range, and provides a correction suggestion with a detected type of error in the transcribed text.

14. The detection system according to claim 13, wherein the error detection module subtracts or superimposes the first and second speech signals.

15. The detection system according to claim 14, wherein the error detection module generates a comparison signal, a distinct pattern in the comparison signal being assigned to a corresponding type of error in the transcribed text and a correction suggestion being provided in accordance with the detected type of error in the transcribed text.

16. A computer readable medium having stored thereon a computer program for controlling a computer to perform error detection for a speech-to-text transcription system that provides a transcribed text from a first speech signal, the computer program controlling the computer to perform the steps of:

synthesizing a second speech signal from the transcribed text;

matching speed and/or volume of the second speech signal to speed and/or volume of the first speech signal;

providing first and second speech signal outputs for a comparison between first and second speech signals; and at least one of:

providing the first and second speech signals and/or the comparison signal acoustically or visually for error detection purpose, outputting an error indication when the comparison between the first and second signals is beyond a predefined range, and assigning distinct patterns in the comparison between the first and second signals to corresponding types of errors in the transcribed text and providing correction suggestions for the detected errors in the transcribed text.

17. The computer readable medium according to claim 16, wherein the computer program further controls the computer to perform the step of:

subtracting or superimposing first and second speech signals.

18. The computer program according to claim 16, wherein the computer program further controls the computer to perform the steps of:

assigning a distinct pattern in the comparison between the first and second speech signals that does not match any previous distinct patterns as a new distinct pattern indicative of a new detected type of error in the transcribed text.

* * * * *